US011141795B2

United States Patent
Schleicher

(10) Patent No.: US 11,141,795 B2
(45) Date of Patent: Oct. 12, 2021

(54) CUTTING TOOL AND METHOD FOR MANUFACTURING A CUTTING TOOL

(71) Applicant: Kennametal Inc., Latrobe, PA (US)

(72) Inventor: Sebastian Schleicher, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/138,528

(22) Filed: Sep. 21, 2018

(65) Prior Publication Data

US 2019/0091771 A1    Mar. 28, 2019

(30) Foreign Application Priority Data

Sep. 22, 2017    (DE) .......................... 102017122054.2

(51) Int. Cl.
| B23B 27/10 | (2006.01) |
| B23C 5/28 | (2006.01) |
| B23B 51/06 | (2006.01) |

(52) U.S. Cl.
CPC .............. B23B 27/10 (2013.01); B23B 51/06 (2013.01); B23C 5/28 (2013.01); *B23B 2250/12* (2013.01); *B23B 2251/50* (2013.01)

(58) Field of Classification Search
CPC . B23B 2250/12; B23B 27/10; B23B 2205/04; B23B 51/06; B23C 2250/12; B23C 5/28; B23C 5/109; B23C 2210/165
See application file for complete search history.

(56) References Cited

U.S. PATENT DOCUMENTS

| 7,530,769 | B2 | 5/2009 | Kress |
| 7,931,425 | B2 | 4/2011 | Morrison |
| 8,621,964 | B2 | 1/2014 | Filho |
| 8,734,069 | B2 * | 5/2014 | Abe .................... B23B 27/1614 408/239 R |
| 10,201,862 | B2 | 2/2019 | Kachler |
| 2007/0283786 | A1 † | 12/2007 | Kappmeyer |
| 2008/0175676 | A1 * | 7/2008 | Prichard ............... B23C 5/2221 407/11 |
| 2011/0020073 | A1 * | 1/2011 | Chen ...................... B23B 27/10 407/11 |
| 2012/0087746 | A1 * | 4/2012 | Fang ...................... B23B 27/10 407/11 |
| 2013/0129428 | A1 * | 5/2013 | Henry ..................... B23B 27/04 407/11 |
| 2015/0063926 | A1 * | 3/2015 | Wu ......................... B23B 27/10 407/11 |

(Continued)

FOREIGN PATENT DOCUMENTS

DE      102017126931 A1 *  5/2019  ......... B23Q 11/1046

*Primary Examiner* — Nicole N Ramos
(74) *Attorney, Agent, or Firm* — Larry R. Meenan

(57) ABSTRACT

A cutting tool, in particular for machining metal, is described. It comprises a tool main body that has at least one interface for receiving a cutting insert that can be attached to the tool main body. At least one cooling duct is provided in the tool main body and has, at its end on the interface side, an outlet section with an elongate outlet cross-section on the interface side. The tool main body is manufactured at least in sections by means of a generative manufacturing process. A method for manufacturing such a cutting tool is also presented.

17 Claims, 3 Drawing Sheets

(56) References Cited

U.S. PATENT DOCUMENTS

2015/0328688 A1\* 11/2015 Johansson ............. B23B 27/143
                             407/11
2016/0175938 A1†  6/2016 Kaufmann
2017/0252839 A1†  9/2017 Donisi
2018/0065196 A1†  3/2018 Kachler \* cited by examiner
† cited by third party

CUTTING TOOL AND METHOD FOR MANUFACTURING A CUTTING TOOL

RELATED APPLICATION DATA

The present application claims priority pursuant to 35 U.S.C. § 119(a) to German Patent Application No. 102017122054.2 filed Sep. 22, 2017, which is incorporated herein by reference in its entirety.

FIELD

The invention relates to a cutting tool, in particular for machining metal, and methods of manufacturing the cutting tool.

BACKGROUND

Cutting tools are often used in the prior art and can, for example, be designed as milling, turning, or drilling tools.

In many applications, cooling and/or lubricating the process zone is required when machining metal. For this reason, cutting tools were developed, in the main bodies of which cooling ducts extend, through which the coolant or cooling lubricant can be introduced into the process zone.

Such cooling ducts are traditionally produced by means of drilling operations. The cooling ducts thus consist of a plurality of straight bores. In this respect, the orientation and course of the cooling ducts are however limited by manufacturing boundary conditions. The manufacturing of curved cooling ducts is particularly complex since these cooling ducts must be approximated by a plurality of straight bore sections.

It is moreover known to manufacture cooling ducts by means of milling or erosion methods.

For example, it can be taken from US 2011/0305531 A1 that it is important for the purposes of efficient cooling or cooling lubrication of the process zone to introduce the coolant or cooling lubricant into the process zone as specifically as possible. To this end, the cooling ducts can be designed to have differently designed outlet cross-sections.

In order for the course of the cooling ducts to be less dependent on manufacturing limitations, US 2007/0283786 A1 moreover proposed, for example, to produce cutting tools or tool main bodies by means of generative or additive manufacturing (AM) methods and, in doing so, to provide cooling ducts of any shape in the tool main body.

SUMMARY

The object of the invention is to further improve cutting tools with cooling ducts provided in the tool main body. In doing so, a cooling of the process zone that is as effective and efficient as possible is to be achieved.

The object is achieved by a cutting tool of the aforementioned type, with a tool main body comprising at least one interface for receiving a cutting insert, in particular an indexable insert, that can be attached to the tool main body, with at least one cutting edge, wherein at least one cooling duct is provided in the tool main body, and the cooling duct has, at its end on the interface side, an outlet section with an elongate outlet cross-section on the interface side, and wherein the tool main body is manufactured at least in sections by means of a generative manufacturing method.

The term "cooling duct" is to refer to a duct or channel for guiding a coolant or cooling lubricant. Moreover, "generative manufacturing method," which is also often called an additive manufacturing method or 3D printing, is to refer to a manufacturing method in which a component is built from a shapeless, i.e., liquid or powder, or a neutrally shaped, e.g., strip or wire-shaped, material by means of a chemical or physical process. The generative manufacturing methods can roughly be classified into powder-bed methods, open-space methods, liquid-material methods, and other layering methods.

The elongate outlet cross-section on the interface side can also be called slit-shaped.

By manufacturing the tool main body by means of a generative manufacturing method, the cooling ducts and/or outlet cross-sections can be designed relatively freely and thus be adapted optimally to the purpose of the cutting tool. In comparison to conventional machining manufacturing methods, almost all geometries, i.e., in particular courses and cross-sections of cooling ducts, can be manufactured in this way. The outlet direction of a coolant can consequently be directed very precisely at the process zone and/or a cutting edge. As a result of the elongate shape of the outlet cross-section, the process zone and/or the cutting edge can moreover be supplied evenly with coolant or cooling lubricant. In comparison to known cooling ducts through which the coolant or cooling lubricant is introduced selectively into the process zone, this results in a more even cooling and/or lubricating effect. Overall, efficient and targeted cooling and/or lubrication of the process zone is thus ensured so that cutting tools according to the invention have high cutting performances. Such cutting tools can furthermore be easily and cost-effectively manufactured by means of generative manufacturing processes.

According to one embodiment, the cooling duct comprises a supply section which adjoins an end of the outlet section facing away from the interface and has a substantially constant, in particular circular, cross-section. The supply section thus has a relatively simple geometry and can therefore be manufactured easily and cost-effectively. The supply section can also be manufactured in a conventional manner, i.e., for example, by drilling. It serves to reliably provide coolant or cooling lubricant at the outlet section.

The cutting tool preferably comprises a cutting insert, in particular an indexable insert, attached to the interface. Cutting inserts are a common way of providing the cutting edges on a cutting tool. They are generally made of a high-strength material so that a long-lasting and reliable cutting tool with good cutting properties is produced. A particularly common type of cutting inserts are indexable inserts.

In a development, the outlet cross-section is substantially directed at the active cutting edge, i.e., the cutting edge that is currently used for cutting; in particular, a normal to the outlet cross-section is substantially directed at the active cutting edge. In the case of a cutting tool, the process zone is defined in the surroundings of the cutting edge. The cutting edge is in the center of the process zone so to speak. Produced here are, among other things, chips to be removed and heat to be dissipated. Coolant or cooling lubricant is thus specifically brought to the point where friction, heat, and chips are produced. The cooling and/or lubrication is therefore particularly effective. A cutting tool with particularly good cutting properties thus results.

In a variant, a cross-section of the outlet section changes along a cooling duct center axis toward the outlet cross-section, in particular continuously decreases in the direction of the outlet cross-section on the interface side. The cooling duct center axis in this case is understood as the line that connects the centers of all cross-sections of the cooling duct.

In the case of a cylindrical coolant duct, the cooling duct center axis would thus be the axis of symmetry of the cylinder. The pressures and flow velocities in the outlet section can be adjusted by a changing cross-section. A nozzle can in particular be realized, from which the coolant or cooling lubricant exits at high pressure and high velocity. A particularly effective and efficient cooling and/or lubrication of the process zone can thus take place.

In this case, the cross-section of the outlet section can substantially only change in a dimension that is transverse to the direction of extent of the cutting edge. The dimension of the cross-section along the cutting edge thus substantially remains constant. This means that coolant or cooling lubricant is substantially applied to the cutting edge along its entire length. The already mentioned adjustment of the pressures and flow velocities thus does not take place at the expense of the covering of the process zone. The pressures and the flow velocities along the cutting edge are moreover substantially equal. Thus, particularly good cooling and/or lubrication results so that a particularly efficient cutting tool is produced.

In a preferred embodiment, the outlet cross-section is substantially rectangular or arc-shaped. The outlet cross-section thus has the shape of a straight or curved slit. In accordance with the shape of the outlet cross-section, an exiting stream of coolant or cooling lubricant also has a substantially rectangular or arc-shaped cross-section. This corresponds to the geometric shape of common process zones so that these process zones are supplied with coolant or cooling lubricant in a particularly effective and efficient manner.

In doing so, one side of the rectangular outlet cross-section or of the arc-shaped outlet cross-section can extend substantially parallelly to the cutting edge, and/or a length of the side of the rectangle or an arc length can substantially correspond to a length of the cutting edge. Arc-shaped outlet cross-sections are in this case preferably used in connection with arc-shaped cutting edges, whereas rectangular outlet cross-sections are preferably used in connection with linear cutting edges. The correspondence of the length between the outlet cross-section and the cutting edge is in this case to be understood broadly so that, in extreme cases, sides of the rectangle or arc lengths, the length of which is 50% to 150% of the cutting edge length, can also be understood to be included. In each case, a coolant or cooling lubricant is thus introduced into the process zone particularly precisely. This results in improved cutting properties of the cutting tool.

The entire tool main body is advantageously manufactured by means of a generative manufacturing process. In such a cutting tool, the cooling ducts can have almost any cross-sections and courses. It is therefore possible to adapt them precisely to the desired application so that a cutting tool results that is particularly well adapted thereto.

Only one section of the tool main body, which section comprises the outlet section, can also alternatively be manufactured by means of a generative manufacturing process. The base of the tool main body, i.e., the remainder of the tool body, can in this case be manufactured in a conventional manner, i.e., by machining. The section comprising the outlet section can either be manufactured separately and then joined to the base of the tool main body, or be manufactured directly on the base of the tool main body. This thus results in modular tool main bodies in which different sections comprising the outlet section can be used on an unchanging base of the tool main body. Improved cooling or cooling lubrication properties thus result. Additionally, a cutting tool can thus be adapted very easily to its purpose.

The cutting tool can be a rotary, milling, or drilling tool.

The object is moreover achieved by a method for manufacturing a cutting tool according to the present invention. The method comprises the following steps:
a) Manufacturing a tool main body of the cutting tool by means of a generative manufacturing process, or
b) Manufacturing a section of the tool main body comprising an outlet section of a cooling duct by means of a generative manufacturing process.

As already mentioned, the use of a generative manufacturing process allows for designing the cooling ducts and/or their outlet cross-sections particularly freely. As a result, the cooling ducts can be designed such that effective and efficient cooling of the assigned cutting edge or cutting edges is ensured. Generative manufacturing processes are moreover relatively easy and cost-effective to use, in particular when low quantities are to be produced.

According to a development, a base part of a tool main body is provided, and the section of the tool main body comprising the outlet section is manufactured on the base part of the tool main body. The aforementioned advantages and effects relating to the generative manufacturing processes thus only relate to the section of the tool main body comprising the outlet section. The base part of the tool main body, i.e., the remainder of the tool main body, can in this case be manufactured in a conventional manner, i.e., by machining. The advantages of generative manufacturing processes can thus be combined with the advantages of conventional manufacturing processes. This can, for example, be exploited by manufacturing a high number of variants of tool main bodies on the basis of a base part of the tool main body that is always the same, these variants only differing by the section comprising the outlet section. In this way, tool main bodies that are always adapted to an individual purpose can be manufactured easily.

The section comprising the outlet section can alternatively also be manufactured separately and then be joined to the base of the tool main body. To this end, the section comprising the outlet section can be welded, soldered, glued, and/or screwed to the base part of the tool main body.

In a variant, the base part of the tool main body is manufactured in a conventional manner. For example, the base part of the tool main body is manufactured by means of a machining process or by means of an original molding or a re-molding process.

The manufacturing of a supply section of the cooling duct in the base part of the tool main body can also take place before the manufacturing of the section of the tool main body comprising the outlet section, wherein the supply section adjoins the outlet section and has a substantially constant, in particular circular, cross-section. In other words, the base part of the tool main body can already be manufactured before the section of the tool main body comprising the outlet section is manufactured. In this context, it is, for example, conceivable to store several base parts of the tool main body in a storage area and to manufacture the sections comprising the outlet section after an individual order has been placed by a customer. Customized tool main bodies can thus be manufactured in a particularly short period of time.

The generative manufacturing process can be a selective laser melting process, a selective laser sintering process, a binder jetting process, an electron beam melting process, or a metal powder application process.

By means of the generative manufacturing process, a steel material, a stainless steel material, and/or a titanium material can be processed. An exemplary steel material is in this respect tool steel H13/1.2344.

BRIEF DESCRIPTION OF THE DRAWINGS

The invention is explained below with reference to various exemplary embodiments which are shown in the accompanying drawings. Shown are.

DETAILED DESCRIPTION

Figure 1:
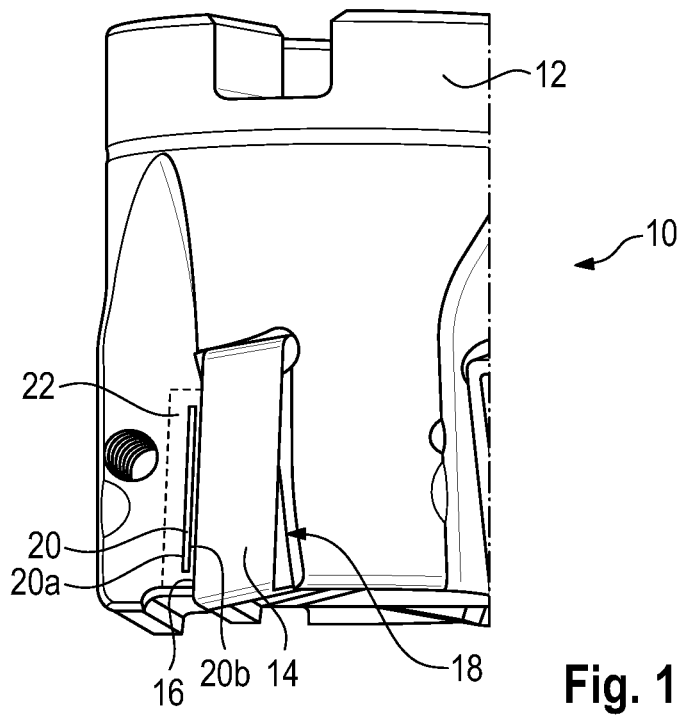
FIG. 1 a cutting tool according to the invention in accordance with a first embodiment manufactured by means of a method according to the present invention, FIG. 2 the cutting tool of FIG. 1, wherein the cutting inserts are omitted, FIG. 3 a cutting tool according to the invention in accordance with a second embodiment manufactured by means of a method according to the invention, FIG. 4 a cutting tool according to the invention in accordance with a third embodiment manufactured by means of a method according to the present invention in a partially transparent illustration, FIG. 5 a schematic longitudinal section of a cooling duct of a cutting tool according to the invention, FIG. 6 a schematic longitudinal section of an alternative cooling duct of a cutting tool according to the invention, and FIG. 7 two schematic variants of an outlet cross-section of a cooling duct shown in FIG. 5 or 6.
Figure 2:
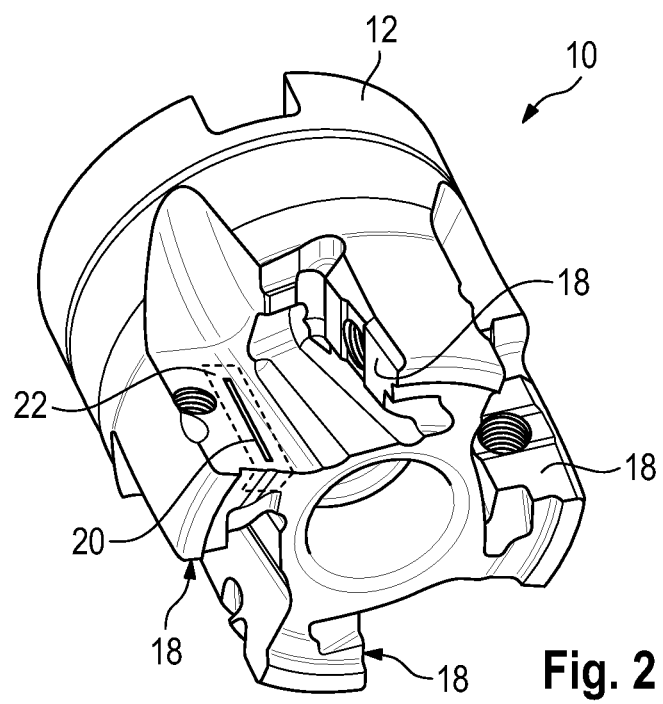

FIGS. 1 and 2 show a cutting tool 10 that is designed as a milling tool in the embodiment shown.

It comprises a tool main body 12 and a plurality of cutting inserts 14 which each comprise at least one cutting edge 16, and which are designed as indexable inserts in the embodiment shown.

The cutting inserts 14 are each attached to an interface 18 that is formed on the tool main body 12 and that is configured to receive cutting inserts 14.

A cooling duct, of which only an elongate outlet cross-section 20 on the interface side can be seen in FIGS. 1 and 2, is present in the tool main body 12. Said outlet cross-section is substantially directed at the currently active cutting edge 16.

Figure 4:
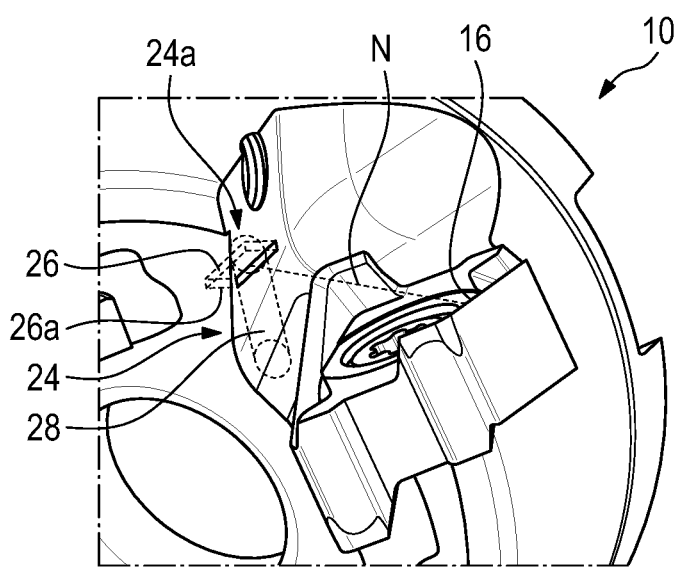
Figure 5:
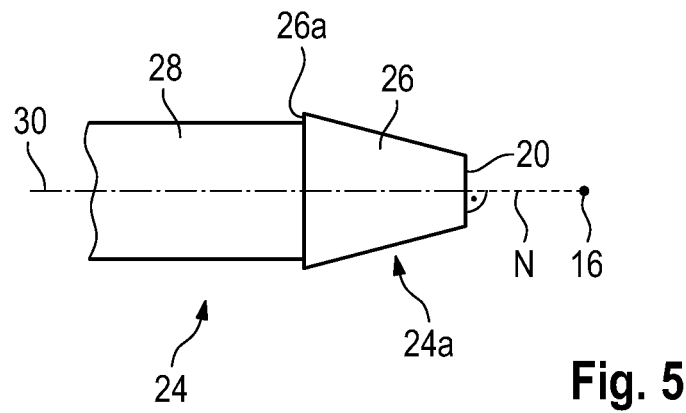
Figure 6:
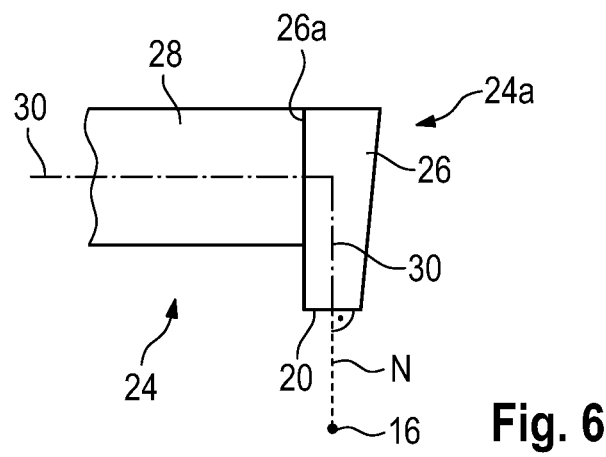

This means that a normal N to the outlet cross-section 20 is substantially directed at the cutting edge 16 (see FIGS. 4, 5, and 6).

The outlet cross-section 20 is slit-shaped, e.g., substantially rectangular. In this case, the sides 20a and 20b of the rectangle are substantially aligned parallelly to the cutting edge 16.

Measured transversely to its longitudinal extent, the outlet cross-section 20 has a maximum width of 2 mm, in particular 1 mm, and a longitudinal extent that corresponds to at least three times, in particular at least five times, the maximum width measured transversely to the longitudinal extent. In the case of an arc-shaped outlet cross-section, the length is measured along the center axis of the arc.

At the same time, a length of the sides 20a, 20b of the rectangle substantially corresponds to a length of the cutting edge 16. In the embodiment shown, the length of the sides 20a, 20b of the rectangle approximately corresponds to 70% of the length of the cutting edge 16.

Figure 3:
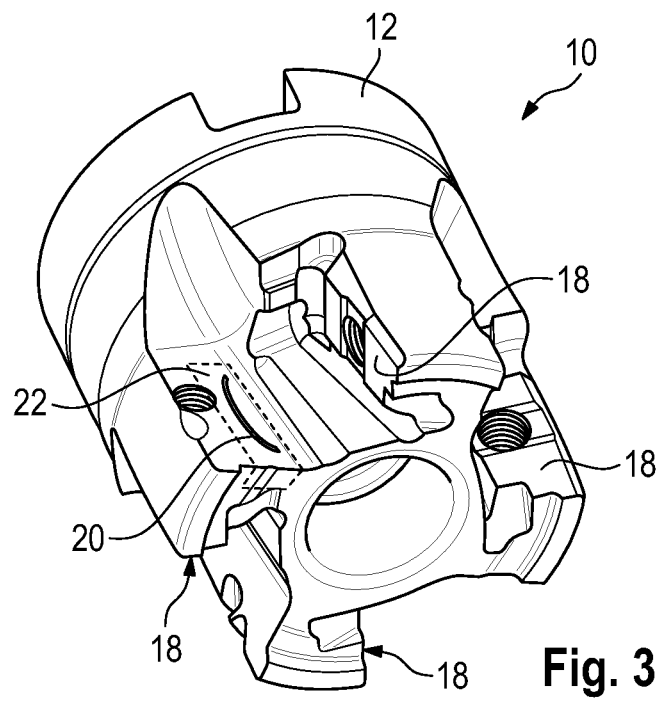

The embodiment according to FIG. 3 substantially differs from the exemplary embodiment of FIGS. 1 and 2 by the shape of the outlet cross-section 20.

In this case, the outlet cross-section 20 is arc-shaped.

Such an outlet cross-section 20 is preferably used in connection with a cutting insert 14 (not shown further), the cutting edge 16 of which is also arc-shaped. Such a cutting insert 14 is in particular a substantially round indexable insert.

Analogously to the embodiment shown in FIG. 1, the arc-shaped outlet cross-section 20 then substantially extends parallelly to the cutting edge 16.

An arc length of the arc-shaped outlet cross-section 20 furthermore substantially corresponds to a length of the arc-shaped cutting edge 16.

Figure 7:
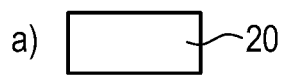
Figure 7:

A cooling duct 24 that is composed of an outlet section 26 and a supply section 28 can be seen in the embodiment of the cutting tool 10 shown in FIG. 4 and in FIGS. 5-7.

The outlet section 26 is in this case arranged at an end 24a of the cooling duct 24 on the interface side.

The supply section adjoins an end 26a of the outlet section 26 facing away from the interface 18 and has a substantially constant cross-section.

In the exemplary embodiment of FIG. 4, the cross-section of the supply section 28 is substantially constant and circular.

As can be seen in particular in FIGS. 5 and 6, a cross-section of the outlet section 26 changes along a cooling duct center axis 30.

In the embodiments shown, the cross-section of the outlet section 26 decreases toward the outlet cross-section 20. The outlet section 26 thus forms a nozzle geometry.

The cooling duct center axis 30 in this case is defined as the line that connects the centers of all cross-sections of the cooling duct 24. In the exemplary embodiment of FIG. 6, the cooling duct center axis 30 is therefore kinked.

The cross-section of the outlet section 26 furthermore changes exclusively in a direction that is transverse to a direction of extent of the cutting edge 16. The entire width of the cutting edge is thus supplied with cooling lubricant (see FIG. 7).

The cutting tool 10 can manufactured in all embodiments in accordance with two variants.

Either the tool main body 12 as a whole or only the section 22 of the tool main body 12 comprising the outlet section 26 is manufactured by means of a generative manufacturing process (see in particular the dashed lines in FIGS. 1 through 3).

In the second variant, the other components of the tool main body 12, which can also be called the base part of the tool main body, are, for example, manufactured in a conventional manner.

Such a base part of a tool main body is then provided, and the section 22 comprising the outlet section 26 is manufactured thereon.

In doing so, the supply section 28 of the cooling duct 24 in the main part of the tool main body is produced before the manufacturing of the section 22 of the tool main body 12 comprising the outlet section 26.

In the second variant, the section 22 comprising the outlet section 26 can also alternatively be manufactured separately from the base part of the tool main body. Both parts are subsequently joined, e.g., soldered.

In the embodiments shown, a selective laser melting process is used as the generative manufacturing process.

A steel material, in particular a tool steel, is processed by means of this process.

The invention claimed is:

1. A cutting tool with a tool main body comprising:
   at least one interface for receiving a cutting insert for attachment to the tool main body, the cutting insert having at least one cutting edge, wherein at least one cooling duct is provided in the tool main body and the cooling duct comprises, at an end for expelling coolant directly to the cutting insert, an outlet section with a substantially rectangular or arc-shaped outlet cross-section above the interface, wherein the tool main body is manufactured at least in sections by means of an additive manufacturing process, and wherein a length of a side of the rectangular outlet cross-section or an arc length substantially corresponds to a length of the at least one cutting edge.

2. The cutting tool according to claim 1, wherein the cooling duct comprises a supply section that adjoins an end of the outlet section facing away from the interface and has a substantially constant cross-section.

3. The cutting tool according to claim 1, wherein the cutting tool comprises a cutting insert attached to the interface.

4. The cutting tool according to claim 3, wherein the outlet cross-section is substantially directed at a cutting edge of the cutting insert engaging a workpiece.

5. The cutting tool according to claim 1, wherein a cross-section of the cooling duct changes along a cooling duct center axis toward the outlet cross-section.

6. The cutting tool according to claim 3, wherein the cross-section of the outlet section changes substantially only in a dimension transverse to a direction of extent of the cutting edge.

7. The cutting tool according to claim 1, wherein a side of the rectangular outlet cross-section or of the arc-shaped outlet cross-section extends substantially parallelly to the cutting edge, and/or a length of the side of the rectangular outlet cross-section or an arc length substantially corresponds to a length of the cutting edge.

8. The cutting tool according to claim 1, wherein, measured transversely to its longitudinal extent, the outlet cross-section (20) has a maximum width of 2 mm.

9. The cutting tool according to claim 1, wherein the outlet cross-section has a longitudinal extent that corresponds to at least three times a maximum width measured transversely to the longitudinal extent.

10. The cutting tool according to claim 1, wherein the entire tool main body is manufactured by means of an additive manufacturing process.

11. The cutting tool according to claim 1, wherein only a section of the tool main body comprising the outlet section is manufactured by means of an additive manufacturing process.

12. The cutting tool according to claim 1, wherein the cutting tool is a milling, or drilling tool.

13. The cutting tool of claim 4, wherein a normal (N) to the outlet cross-section is substantially directed at the cutting edge of the cutting insert engaging the workpiece.

14. The cutting tool of claim 3, wherein the cross-section of the outlet section continually decreases in a direction toward the cutting insert.

15. The cutting tool of claim 1, wherein the outlet cross-section is positioned in a wall of the tool main body parallel to a flank face of the cutting insert.

16. A cutting tool with a tool main body comprising:
    at least one interface for receiving a cutting insert for attachment to the tool main body, the cutting insert having at least one cutting edge, wherein at least one cooling duct is provided in the tool main body and the cooling duct comprises, at an end for expelling coolant, an outlet section with an elongate outlet cross-section, the elongate outlet cross-section above the interface and tangential to rotation of the tool main body during a cutting operation, and wherein the tool main body is manufactured at least in sections by means of an additive manufacturing process, and wherein a length of a side of the elongate outlet cross-section substantially corresponds to a length of the at least one cutting edge.

17. The cutting tool according to claim 16, wherein the elongate outlet cross-section is substantially rectangular or arc-shaped.

* * * * *